No. 614,796. Patented Nov. 22, 1898.
W. M. DENNISTON.
TRUCK.
(Application filed Jan. 8, 1898.)
(No Model.)
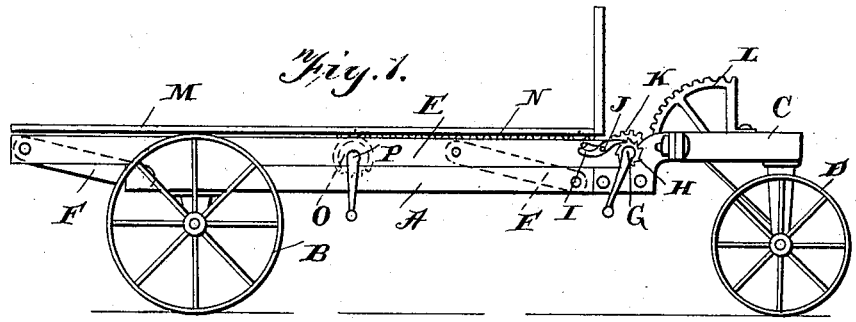
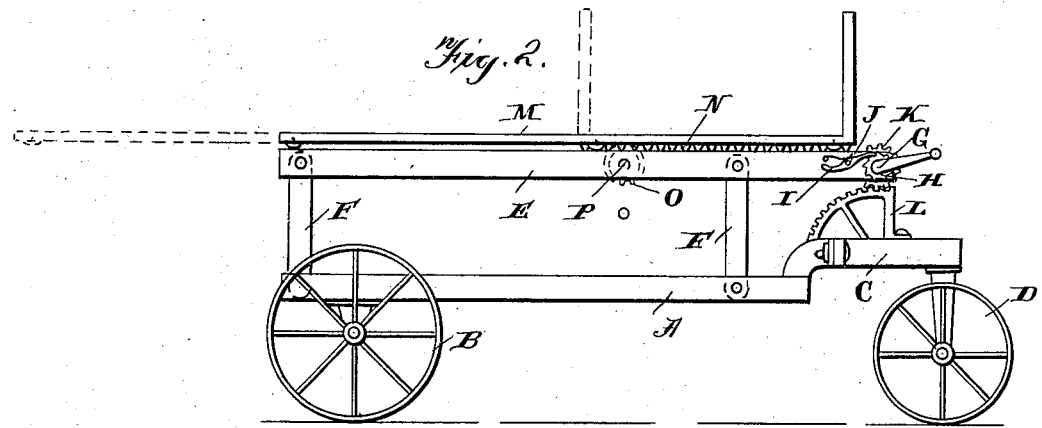
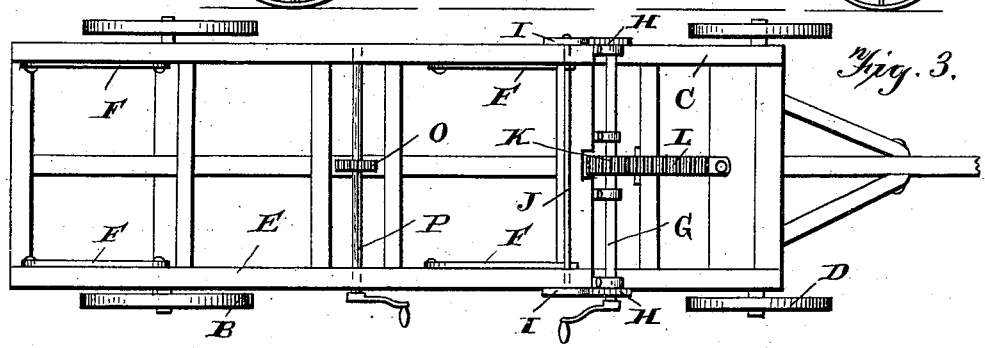
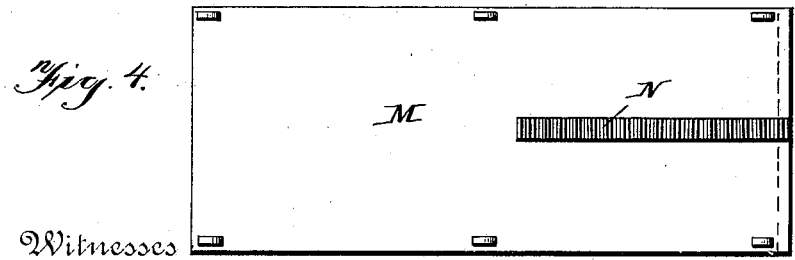
Witnesses
Geo. E. Frech.
B. E. Seitz
Inventor
W. M. Denniston
by A. S. Pattison
Attorney

UNITED STATES PATENT OFFICE.

WILLIAM M. DENNISTON, OF BEDFORD, INDIANA.

TRUCK.

SPECIFICATION forming part of Letters Patent No. 614,796, dated November 22, 1898.

Application filed January 8, 1898. Serial No. 666,052. (No model.)

*To all whom it may concern:*

Be it known that I, WILLIAM M. DENNISTON, of Bedford, in the county of Lawrence and State of Indiana, have invented certain new and useful Improvements in Trucks; and I do hereby declare the following to be a full, clear, and exact description of the invention, such as will enable others skilled in the art to which it pertains to make and use it, reference being had to the accompanying drawings, which form part of this specification.

This invention relates to improvements in trucks; and its object is to provide the truck with an elevating-platform of improved form, whereby the truck will be of convenient height for loading and when loaded the articles thereon may be raised to the height of a car-door or platform for discharge.

A further object is to make the platform longitudinally movable, so that it may be projected, together with its load, to or upon a platform or other surface upon which it is desired to discharge the load.

The invention consists in the novel features of construction hereinafter fully described and claimed, and illustrated by the accompanying drawings, in which—

Figure 1 is a side elevation of my improved truck with the platform in lowered position. Fig. 2 is a similar view showing the platform raised, also the same projected longitudinally in dotted lines. Fig. 3 is a plan view of the truck. Fig. 4 is an inverted plan view of the movable platform.

The main frame A is supported at its rear end by truck B and at its forward end secured to the slightly-elevated frame C of the forward truck D. Frame E is secured to frame A by the links F, as shown, and at the forward end of this frame is journaled shaft G, carrying at its ends ratchets H, adapted to be engaged by the spring-pressed dogs I, secured to the extremities of rod or shaft J, in order that they may have unitary movements. To one extremity of shaft G is secured a crank, and between its ends is arranged gear-wheel K, adapted to engage and travel upon the cogged segment L, secured to frame E of the forward truck D.

Platform M on top of frame E is provided with casters, whereby it may be readily moved longitudinally thereon, and secured centrally to the under side of this platform is rack-bar N, engaged by gear O on shaft P, the latter being journaled transversely in frame E and at one end provided with a crank.

In operation after the load has been deposited upon the platform the same is raised by frame E through the medium of the link connection between the latter and frame A and the gear and segment, as will be understood, and the pawls or dogs will hold the frame and platform at the desired elevation. The load is thus raised and may be conveniently moved into a car upon the platform without lifting, and if it is desired the platform may be moved longitudinally by means of the mechanism before described, and thus in many cases greatly facilitate the movement of goods.

The construction of the truck is simple and comparatively inexpensive, and its vertical and longitudinal adjustments widen its range of usefulness and serve to greatly facilitate the handling of baggage and articles of merchandise and, in fact, all objects for the moving of which trucks are required.

Having thus fully described my invention, what I claim, and desire to secure by Letters Patent, is—

An improved truck comprising a base-frame having at one end a rigid inwardly-projecting arc-shaped cog-segment, an endwise and vertically movable platform normally resting upon the said base and with its adjacent end at a point inside of the said arc-shaped segment, the adjacent end of the said platform having a pinion engaging said arc-shaped segment, and links having their ends pivoted respectively to the base-frame and the platform, substantially as shown and described.

In testimony whereof I affix my signature in presence of two witnesses.

WILLIAM M. DENNISTON.

Witnesses:
  RICHARD FISHER,
  JOHN M. GAINEY,